Figure 1:
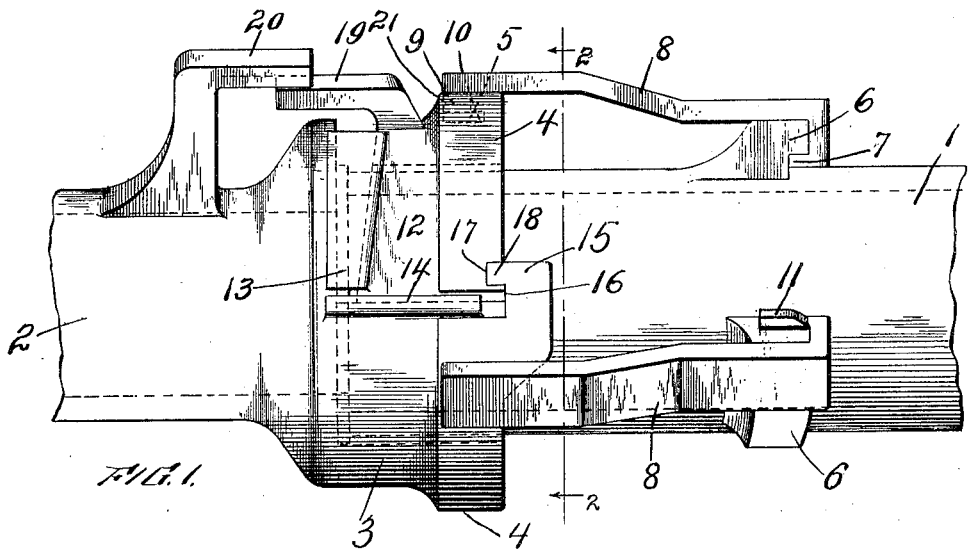

E. J. KELLY.
REPAIR COUPLING.
APPLICATION FILED JAN. 9, 1914.

1,110,632.

Patented Sept. 15, 1914.

Witnesses

Inventor
Eugene J. Kelly,
By John A. Gaul
Attorney

THE NORRIS PETERS CO., PHOTO-LITHO., WASHINGTON, D. C.

UNITED STATES PATENT OFFICE.

EUGENE J. KELLY, OF WASHINGTON, DISTRICT OF COLUMBIA.

REPAIR-COUPLING.

1,110,632.  Specification of Letters Patent.  Patented Sept. 15, 1914.

Application filed January 9, 1914.  Serial No. 811,193.

*To all whom it may concern:*

Be it known that I, EUGENE J. KELLY, a citizen of the United States, residing at Washington, in the District of Columbia, have invented certain new and useful Improvements in Repair-Couplings, of which the following is a specification.

My invention relates to pipe-couplings and more particularly to a repair coupling, to replace a pipe that has been broken or injured, whether the same be exposed or underground; and to connect pipes where a close union, strength and durable qualities are required, such as gas, water pipes and the like.

The object of the invention is to construct a coupling that may be easily and cheaply manufactured, will be durable, the parts thereof may be separately made, may be easily replaced when worn, may be assembled with little effort; and will be absolutely impervious and prevent any leakage. It is especially adapted for use in connection with my Patent No. 1072736, dated Sept. 9, 1913; but is equally useful in analogous structures.

In the drawings forming a part of this specification, and in which like symbols of reference represent corresponding parts in the several views:—

Figure 2:
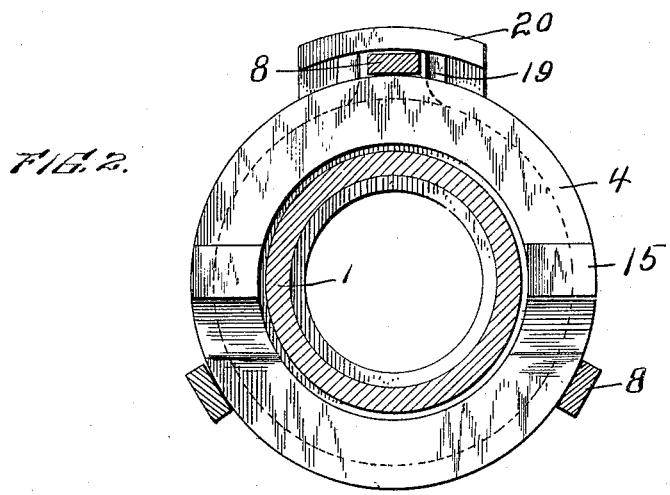
Figure 3:
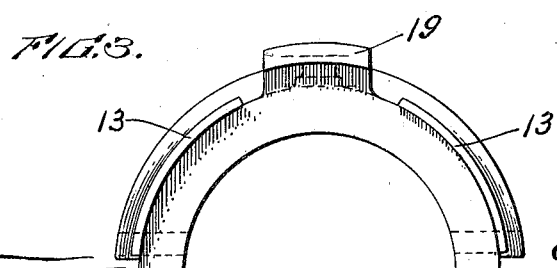

Figure 1 is a section of pipe with my invention applied thereto; Fig. 2 is a transverse section, on the line 2—2, Fig. 1, looking in the direction of the arrow; and, Fig. 3 is a view of the supplemental or repair section, detached, looking in a direction opposite to Fig. 2.

The numerals 1 and 2 indicate the two sections of pipe to be connected; 3 is a collar that, together with the supplemental section, has a shoulder 4, in which a series of arc-shaped recesses 21 are cast or formed; and 5 is a recess formed at the base of the arc-shaped recess. 6 are curved lugs formed on section 1, the same having recesses at their bases. said recesses being formed in the convex faces of the same.

7 are tongues or arms formed on clamps 8, the object of the same being to take into the recesses on the lugs 6; and 9 are lugs on clamp 8, the same having lips 10 to be received in recesses 5.

11 shows the end of tongue 7, adapted to be struck down after the parts are in operative position.

12 represents the supplemental section to which my present invention relates, the same having flanges 13 formed on its sides to hold it in position between the sections and to prevent any dirt or the like getting between the parts.

14 are flanges formed on the sides of the cut-away portion of the pipe section 2; 15 are lugs on the outer extremity of the cut-away portion; 16 recesses formed in the same; 17 recesses formed in the supplemental section; and 18 lugs on the section, the same adapted to take into the recesses in the section. The supplemental section is somewhat shorter than the cut-away portion of the pipe, so that by titlting it on its side the lugs 18 on the same may be slid into the recesses in the section, and when in place will be held by the elements described.

19 is a circular arm extending from the section 12; and 20 a segmental overhanging arm within which arm 19 is adapted to be received and held when the sections are brought together. Recesses 21 are also formed on section 12, to receive the lugs of the clamp 8 and draw the sections together.

The operation of the device will be apparent from the foregoing description. When it is desired to repair a section, the injured or broken portion is removed, the sections brought together, the supplemental or completing sections placed in position, the clamps applied in position and locked by the tongue being struck down as described.

Having now fully described my invention, what I claim as new and desire to secure by Letters-Patent, is:—

1. A repair coupling, comprising a pipe having a cut-away section, a collar adapted to be received in the cut-away portion, interlocking means on the collar and cut-away section to hold the collar in position, and means for drawing the sections together and locking them in position.

2. A repair coupling, comprising a supplemental section adapted to be received between the pipe sections, a cut-away portion in one pipe section to receive the supplemental section, and flanges on the cut-away section and supplemental section for holding the supplemental section in position.

3. A repair coupling for pipe, comprising a section formed with a cut-away portion and an overhanging arm, and a supplemental section adapted to be received in the cut-away portion and formed with an arm adapted to be received within the overhanging arm.

4. A repair pipe coupling, consisting of a section having a cut-away portion, said cut-away section having undercut lugs near its outer edges, and a supplemental section adapted to be received in the cut-away portion and formed with lugs on its lower edges to be received in the undercut lugs of the pipe section.

5. A repair pipe coupling, comprising a pipe section having a cut-away portion an overhanging arm and flanges on its sides, a supplemental section to be received in the cut-away portion and having an arm to be received within the overhanging arm and flanges to engage the sides of the pipe.

6. A repair pipe coupling, comprising a pipe having a cut-away portion and undercut lugs, a supplemental section formed with lugs to engage the grooves of the cut-away portion, inclined lugs on one section, pivotal recesses formed on the other section, and arms engaging the recesses and lugs to draw the parts together and lock the same.

In testimony whereof I affix my signature in presence of two witnesses.

EUGENE J. KELLY.

Witnesses:
A. W. BYRON,
LLOYD A. DOUGLASS.

---

Copies of this patent may be obtained for five cents each, by addressing the "Commissioner of Patents Washington, D. C."